March 17, 1925.　　　　　　　　　　　　　　　　　　　1,530,429
G. SJOLANDER
COMBINED BUMPER AND JACK
Filed Oct. 3, 1924　　　　2 Sheets-Sheet 1
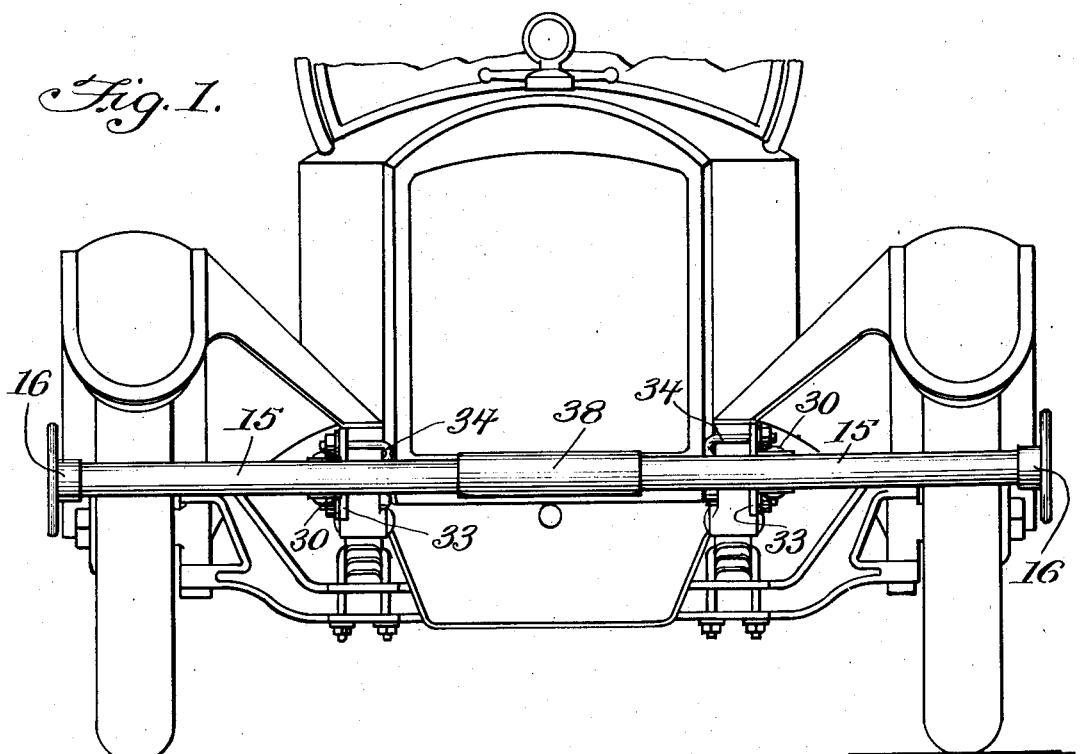
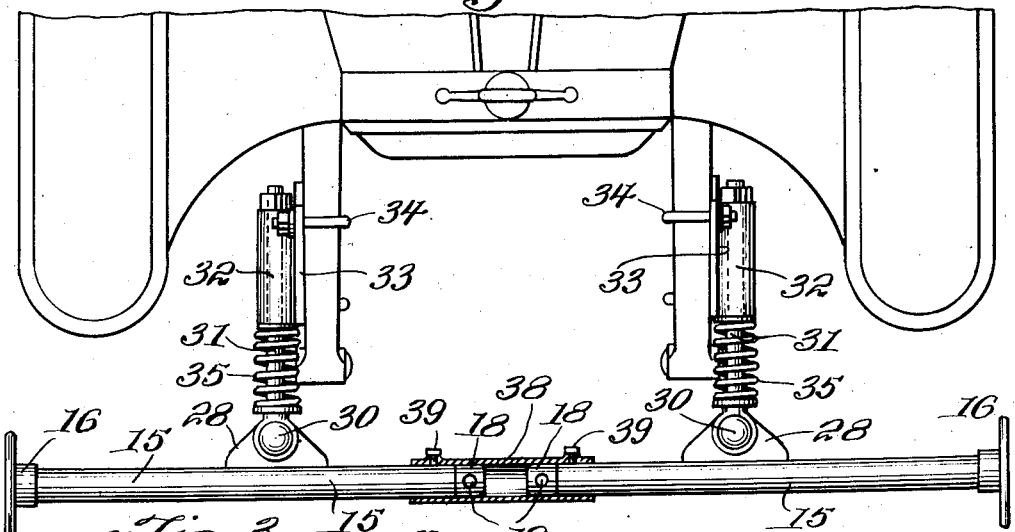
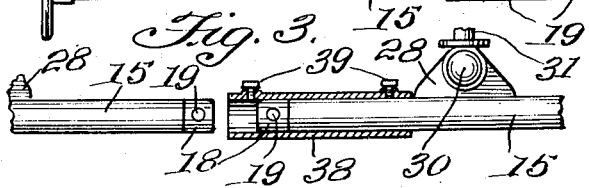

March 17, 1925. 1,530,429
G. SJOLANDER
COMBINED BUMPER AND JACK
Filed Oct. 3, 1924  2 Sheets-Sheet 2
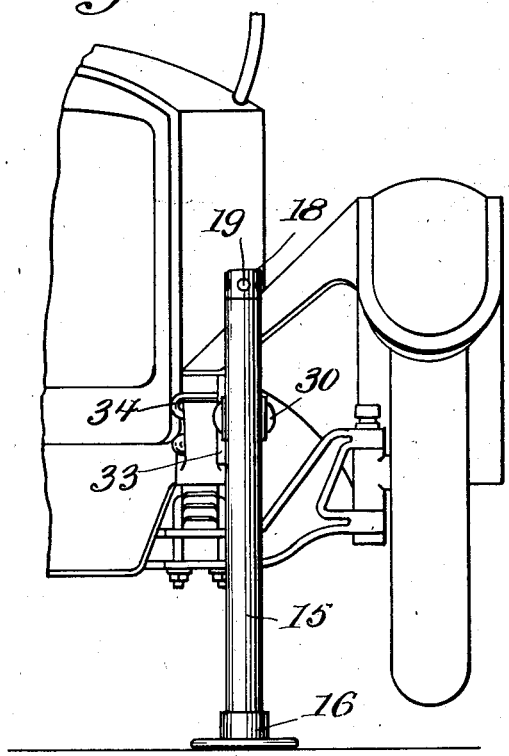
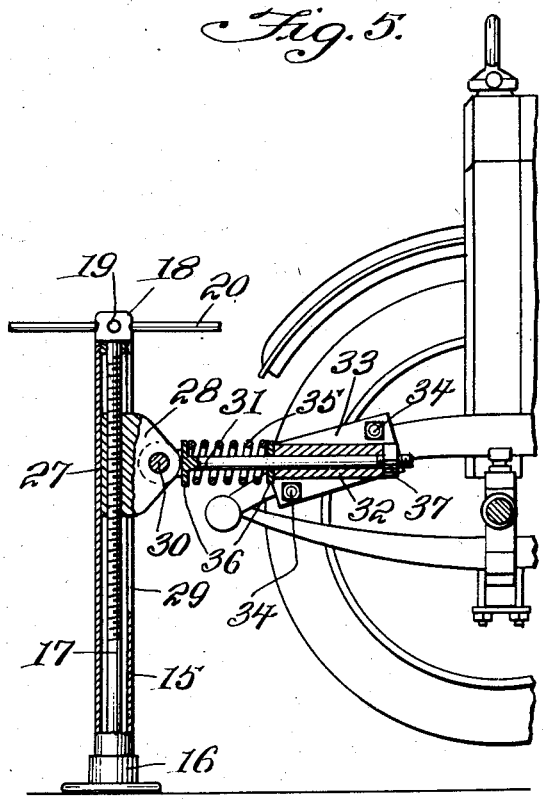
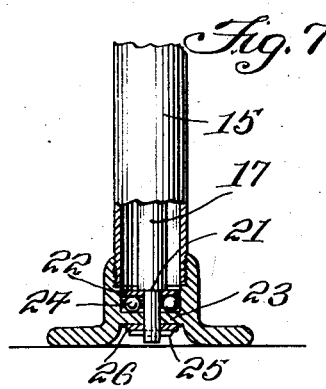
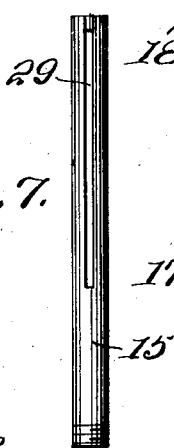
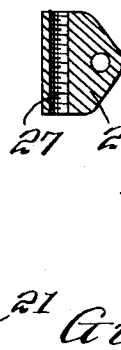
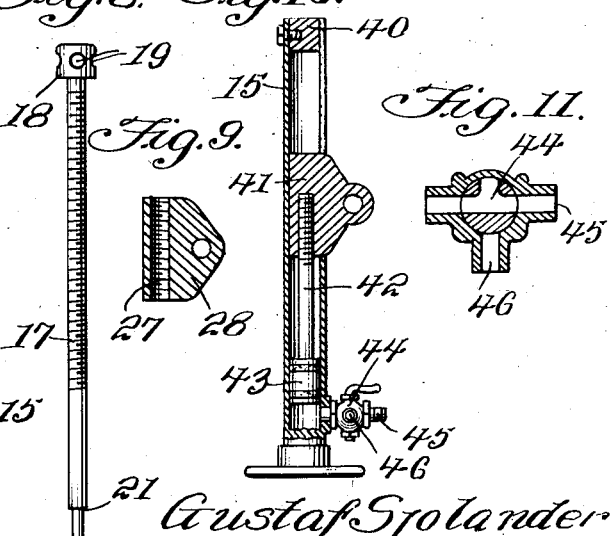
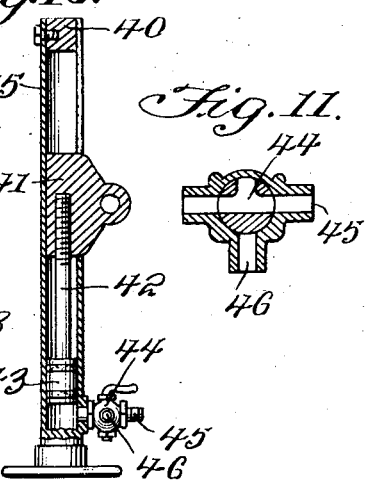

Patented Mar. 17, 1925.

1,530,429

UNITED STATES PATENT OFFICE.

GUSTAF SJOLANDER, OF MIDLAND, MICHIGAN.

COMBINED BUMPER AND JACK.

Application filed October 3, 1924. Serial No. 741,464.

*To all whom it may concern:*

Be it known that I, GUSTAF SJOLANDER, a citizen of the United States, residing at Midland, in the county of Midland and State of Michigan, have invented new and useful Improvements in Combined Bumpers and Jacks, of which the following is a specification.

This invention relates to attachments for vehicles and is an improvement upon a patent granted to me December 30, 1919, and numbered 1,326,795.

Broadly, the present invention, like the patent above mentioned, has for an object the provision of a combined bumper and jack, which will act as a protector for the vehicle when used as a bumper and which will also provide means for lifting said vehicle when used as a jack.

More specifically, the present invention aims to provide a novel construction of bumper and jack which may be readily adjusted for either use and when used as a bumper will provide a strong, durable and attractive device which may be easily and quickly converted into a pair of lifting jacks.

With the above and other objects in view, the invention further includes the following novel features and details of construction, to be hereinafter more fully described, illustrated in the accompanying drawings and pointed out in the appended claims.

In the drawings:—

Figure 1 is a front elevation of a portion of an automobile with the invention arranged to provide a bumper.

Figure 2 is a top plan view of the front portion of an automobile with the invention in use as a bumper, parts being broken away.

Figure 3 is a fragmentary top plan view of the invention per se, the bumper sections being shown disconnected.

Figure 4 is a fragmentary front elevation showing the device used as a jack.

Figure 5 is a vertical sectional view of the same.

Figure 6 is an enlarged fragmentary view partly in section showing one end of one of the bumper sections.

Figure 7 is a detail elevation of one of the sleeves.

Figure 8 is a similar view of one of the lifting screws.

Figure 9 is a sectional view of a nut.

Figure 10 is a sectional view showing a modified form of the invention.

Figure 11 is an enlarged sectional view showing the valve illustrated in Figure 10.

Referring to the drawings in detail wherein like characters of reference denote corresponding parts, the device is shown as comprising a pair of tubular members 15, each of which is adapted for use as a jack, as shown in Figures 4 and 5 of the drawings and also adapted to be connected to form a bumper bar as shown in Figures 1 and 2 of the drawings.

For the purpose of providing a jack, each of the tubular members 15 has threadedly or otherwise secured thereto a foot 16, while extending longitudinally of each of these members is a screw 17.

The screws 17 have secured upon one end a head 18 which is provided with openings 19 for the reception of a removable bar 20, the latter being carried in the tool box or some other convenient portion of the automobile. The lower end of the screw 17 is reduced to provide a shoulder 21 against which bears a washer 22 and between this washer and the bottom 23 of the foot 16 is an anti-friction bearing 24. The screw is held in place by any suitable means, such as a pin 25 and washer 26 which bears against the under face of the bottom 23 of the foot 16. A thrust bearing is thus provided in which the lower end of the screw is swiveled.

Located within the tubular members 15 are nuts 27 which are provided with extensions 28, the said extensions projecting through elongated slots 29 provided in the members 15. Relative longitudinal movement between the nuts and tubular members is thus possible.

Pivotally secured to the extensions 28 of the nuts 27 as shown at 30 are rods 31, the latter having a sliding engagement within sleeves 32 which are carried by plates 33, the latter being clamped to the frame of the automobile by means of U-bolts 34. Springs 35 surround the rods 31 and bear against spaced washers 36 so as to yieldingly force the rods outward, their outward movement being limited by means of nuts 37.

As the construction just described is duplicated upon opposite sides of the automobile, a jack is provided upon each side of the front and of course may be duplicated upon each side of the back so as to provide a jack for each of the four wheels. When not in use these jacks are constructed so as to be converted into bumpers and for this purpose the rods 31 are capable of rotation in the sleeves 32 and have a pivotal connection with the nuts 27. Thus, the tubular members 15 may be horizontally aligned and when in this position may be connected by sleeves 38. The sleeves 38 receive the upper or inner ends of the tubular members 15 and the latter are removably held in position by means of set screws 39. As shown in Figure 3 of the drawings, the set screws are released and the sleeve 38 is moved longitudinally inward so as to release one of the tubular members 15. The sleeve 38 may then be entirely removed from the other tubular member, whereupon the said members may be swung to a vertical position for use as jacks.

In Figures 10 and 11 the tubular member 15 has its inner or upper end closed by a plug 40, while a block 41 is substituted for the nut 27. This block is connected to one end of a rod 42 whose opposite end is secured to a piston 43. A valve 44 is secured to the tubular member 15 beyond the piston 32 and is provided with a nipple 45 for connection with a suitable source of air under pressure, so that when the valve is opened, the piston will be forced upward. A pneumatically operated jack is thus provided. The valve 44 is of the two-way type and is provided with a discharge port 46 so that pressure from the tubular member 15 may be relieved and the block 41 lowered.

The invention is susceptible of various changes in its form, proportions and minor details of construction and the right is herein reserved to make such changes as properly fall within the scope of the appended claims.

Having described the invention what is claimed is:—

1. A combined bumper and jack comprising a sectional bar, each of said sections being of tubular construction, means for attaching the sections to a vehicle, means whereby the sections may be moved relatively to the attaching means for use as jacks and means for detachably connecting the sections in horizontal alignment to provide a bumper bar.

2. A combined bumper and jack for vehicles comprising a sectional bar, means carried by each section for attachment to a vehicle, means whereby the sections may be moved relatively to the attaching means for use as jacks and a telescopic connection for the sections to define a bumper bar.

3. A combined bumper and jack for vehicles comprising a sectional bar, each of said sections being of tubular construction, a member located within and slidingly engaging each section, means connecting the members with the vehicle, means located within the sections and operatively connected to the members, whereby the sections may be moved longitudinally for use as jacks and means for detachably connecting the sections to provide a bumper bar.

4. A combined bumper and jack for vehicles comprising a sectional bar, each of said sections being of tubular construction, a member located within and slidingly engaging each section, a rod pivotally connected to each member and having a rotatable and yieldable connection with the vehicle, means operatively connected to the members, whereby the sections may be moved longitudinally for use as jacks and means for detachably connecting the sections to provide a bumper bar.

5. A combined bumper and jack for vehicles comprising a sectional bar, each of said sections being of tubular construction, a nut located within and slidingly engaging each section, means connecting the nut with the vehicle, a threaded rod extending longitudinally of each section and engaging the nut, means whereby the sections may be rotated to move said sections longitudinally for use as jacks and means for detachably connecting the sections to provide a bumper bar.

6. A combined bumper and jack for vehicles comprising a sectional bar, each of said sections being of tubular construction, a nut located within and slidingly engaging each section, means connecting the nut with the vehicle, a threaded rod extending longitudinally of each section and engaging the nut, a thrust bearing connection between the inner end of the rod and section, whereby the sections may be moved longitudinally for use as jacks and means for detachably connecting the sections to provide a bumper bar.

In testimony whereof I affix my signature.

GUSTAF SJOLANDER.